United States Patent [19]

McMaster et al.

[11] Patent Number: 5,002,599
[45] Date of Patent: Mar. 26, 1991

[54] HEATED GLASS SHEET TOPSIDE SUPPORT DEVICE

[75] Inventors: Robert G. McMaster, Elmore; Harold A. McMaster, Perrysburg, both of Ohio

[73] Assignee: Glasstech, Inc., Perrysburg, Ohio

[21] Appl. No.: 527,081

[22] Filed: May 22, 1990

[51] Int. Cl.$^5$ .................... C03B 23/023; C03B 35/24
[52] U.S. Cl. .................................. 65/182.2; 65/287; 294/64.3
[58] Field of Search ............... 65/182.2, 287, 273, 65/25.2, 25.4; 294/64.3; 414/676

[56] References Cited

U.S. PATENT DOCUMENTS

| | | | |
|---|---|---|---|
| 3,223,443 | 12/1965 | Misson | 65/182.2 |
| 4,282,026 | 8/1981 | McMaster et al. | 65/273 |
| 4,578,103 | 3/1986 | Fackelman | 65/273 |
| 4,615,724 | 10/1986 | Fackelman | 65/182.2 |
| 4,767,437 | 8/1988 | Lampman et al. | 65/287 |

*Primary Examiner*—Joye L. Woodard
*Attorney, Agent, or Firm*—Brooks & Kushman

[57] ABSTRACT

A heated glass sheet topside support device (22,22',22a,22a') is disclosed as including horizontally extending lower and upper plates (38,46) connected by a set of vertically extending passage members embodied by tubes (54) or plate members (54a) to define passages (55,55a,55a'). The support device also includes first and second manifolds (56,58) for supplying pressurized gas and a vacuum through first and second sets of holes (42,42a,42a';44,44a,44a') in the lower plate so as to thereby support a heated glass sheet below the lower plate without any engagement. In one construction, the pressurized gas is supplied through a chamber (48,48a) between the plates through a set of shorter tubes (80,80a) mounted within the first set of holes (42,42a) in the lower plate (38,38a), and the vacuum is drawn from the upper side of the upper plate (46,46a) through the holes (52,52a) therein and through the passages (55,55a) and the second set of holes (44,44a) in the lower plate. In another construction, the vacuum is drawn through the chamber (48,48a') between the plates through the first set of holes (42,42a') in the lower plate (38,38a'), and the pressurized gas is supplied through the holes (52,52a') therein and through the passages (55,55a') and the second set of holes (44,44a') in the lower plate. Each embodiment of the topside support device is supported by fused silica posts (86) that preferably have upper ends including inverted cup-shaped members (102) on which the topside support device is slidably mounted by an associated spherical bearing (106). Positioners (118) for the silica posts (86) and support device locators (134) cooperate in supporting and positioning the topside support device at the proper location.

18 Claims, 5 Drawing Sheets

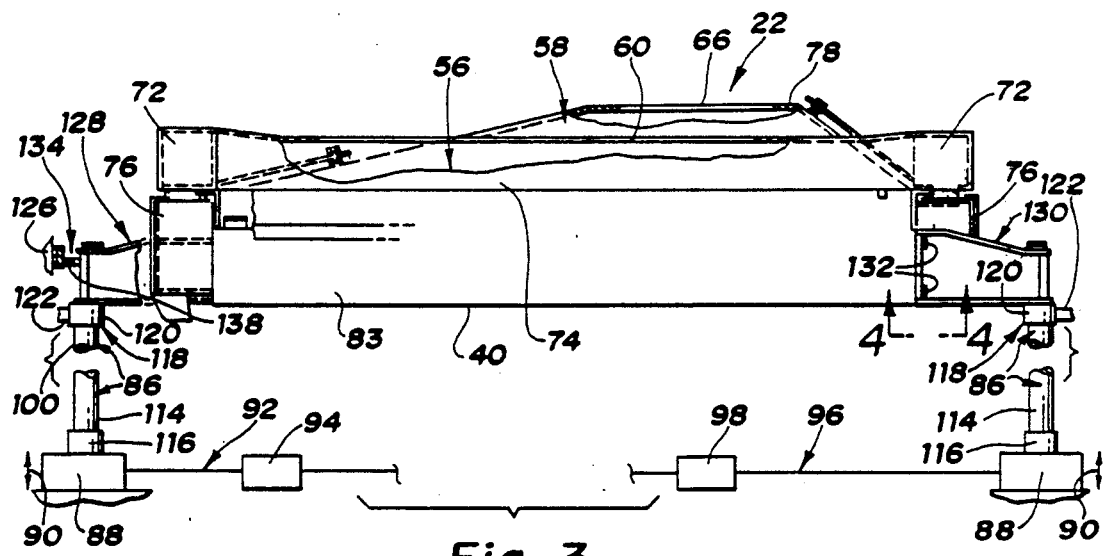
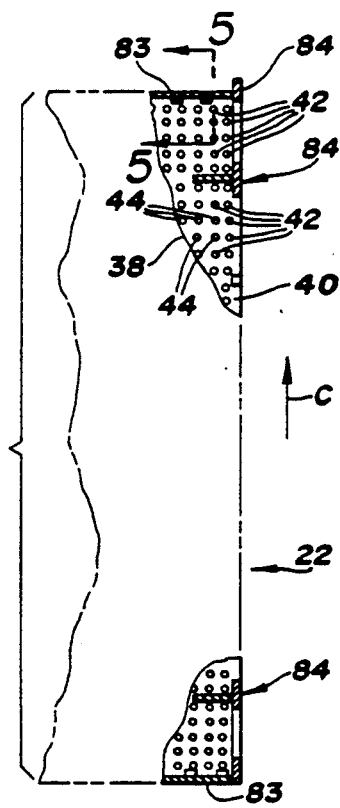
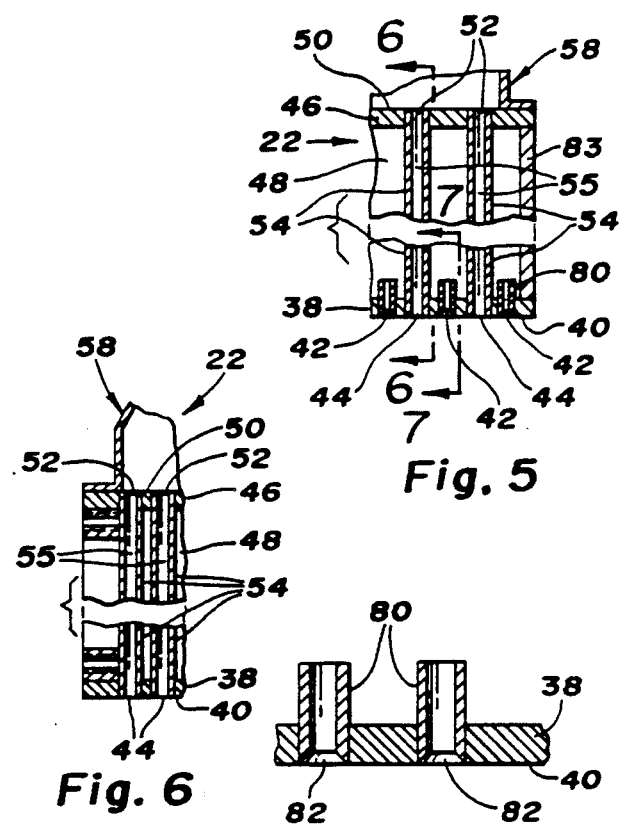

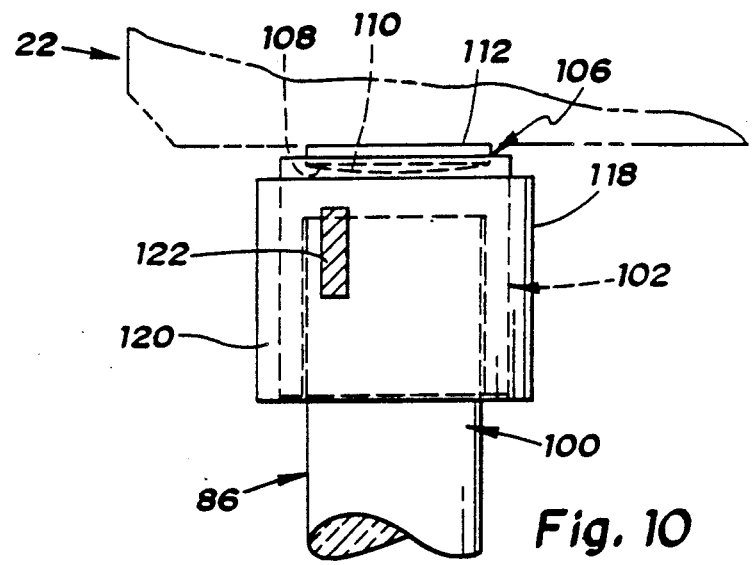
Fig. 10
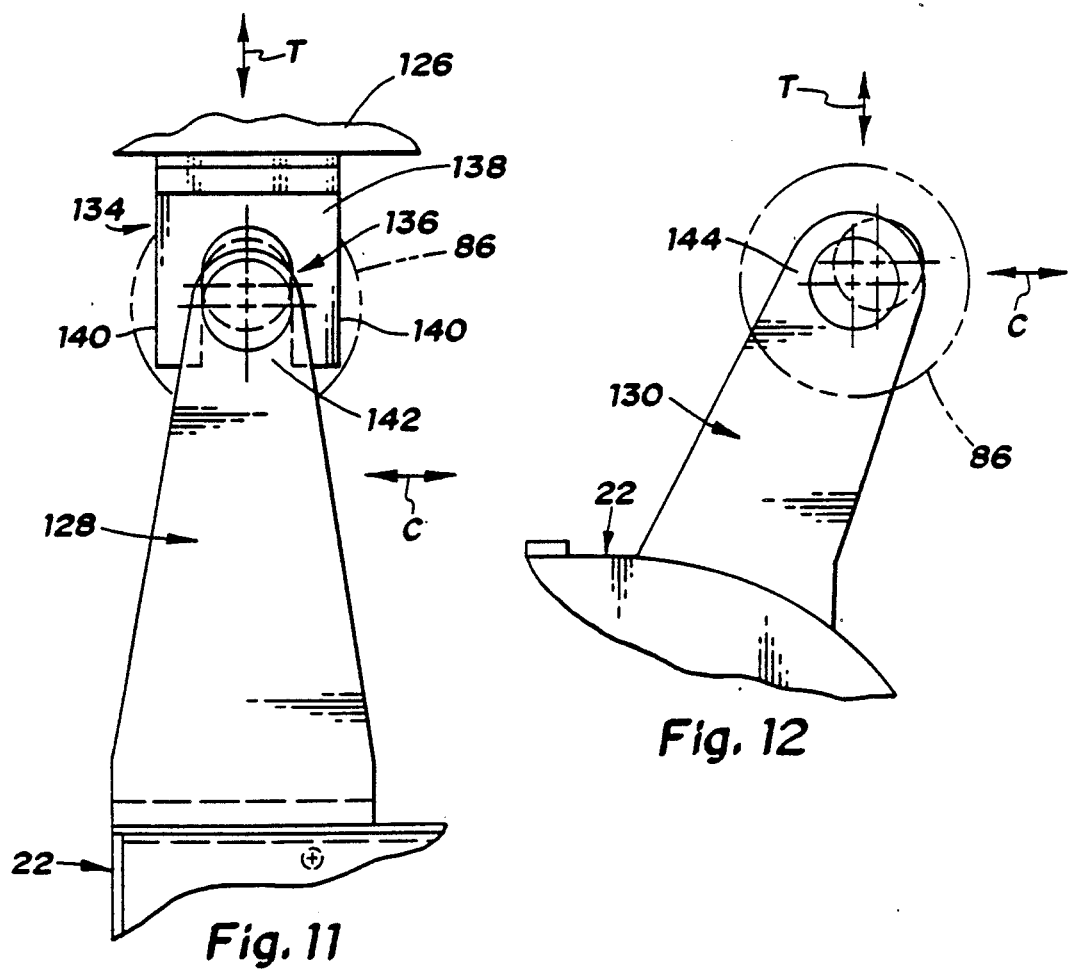
Fig. 11
Fig. 12

HEATED GLASS SHEET TOPSIDE SUPPORT DEVICE

TECHNICAL FIELD

This invention relates to a topside support device for supporting heated glass sheets without any direct engagement.

BACKGROUND ART

Glass sheets are heated to a softened condition in order to perform forming and other processing. One type of forming such as disclosed by U.S. Pat. No. 4,282,026 McMaster et al involves transferring of the heated glass sheet from a heating conveyor to a downwardly facing planar surface of a vacuum platen from which the heated glass sheet is subsequently transferred to a mold for forming to a desired shape. Engagement of the glass sheet with the downwardly facing surface of the vacuum platen can adversely affect the glass surface by markings or other small deformations that can destroy optical quality.

U.S. Pat. No. 3,223,443 Misson discloses what appears to be experimental apparatus for handling of small sample size heated glass sheets by a pressure control support bed that faces downwardly and supports the glass sheet without any direct engagement. This support bed includes a plate from which tubes extend downwardly and have lower ends with inverted cups that are spaced from each other. Pressurized gas is supplied from a plenum above the plate through the tubes to the interior of the cups and a vacuum is drawn between the cups so as to thereby provide both pressurized gas and a vacuum that provides the support of the glass sheet without any direct engagement. However with this construction, thermal warpage of the plate upon heating and cooling during actual use in a factory condition can result in movement between the inverted cups which adversely affects the uniformity of pressurized gas and vacuum and hence the capability of the support bed to support the glass sheet at a constant elevation without flutter. In a modified embodiment, the pressurized gas is supplied through a porous bottom plate and the vacuum is drawn through tubes that project through the bottom plate and have upper ends supported by another plate spaced below the bottom plate. Gas under pressure is thus supplied through small pores in the bottom plate of a size that is disclosed as being preferably in the range of about 0.0002 to 0.025 of an inch, i.e., about 0.05 to 0.065 cm. With such a construction, the pressurized gas is not supplied with sufficient velocity so as to be capable of producing jets spaced from the tubes through which the vacuum is drawn and the capability of this modified support bed to support larger glass sheets is thus questionable.

U.S. Pat. Nos. 4,578,013 and 4,615,724 of Fackelman disclose glass sheet processing including topside transfer apparatus whose preferred embodiment is a refractory platen that supplies pressurized gas and a vacuum to a downwardly facing surface to support a heated glass sheet during transfer from a heating conveyor to a bending mold. The refractory platen is preferably made of fused silica so as to have good resistance to thermal warpage during heating and cooling and thereby overcomes problems associated with the aforementioned Misson patent whose disclosed support bed did not have sufficiently operable structure so as to be capable of functioning in a commercial factory as opposed to merely being used for experimental purposes.

DISCLOSURE OF INVENTION

An object of the present invention is to provide an improved topside support device for supporting a heated glass sheet without any direct engagement with the glass sheet.

In carrying out the above object and other objects of the invention, a heated glass sheet topside support device constructed in accordance with the present invention includes a horizontally extending lower plate made from high temperature metal and having a uniform thickness and a downwardly facing planar surface with first and second sets of spaced holes arranged in repeating patterns and extending downwardly through the lower plate. A horizontally extending upper plate of the device is also made of a high temperature metal and cooperates with the lower plate to define a chamber communicated through the first set of holes in the lower plate with the downwardly facing planar surface of the lower plate. The upper plate has an upper side and includes a set of holes extending downwardly therethrough from its upper side to the chamber. A set of vertically extending passage members have lower ends fixedly mounted by the lower plate and have upper ends fixedly mounted by the upper plate. The passage members define passages communicated through the set of holes in the upper plate with its upper side. The passages are also communicated through the second set of holes in the lower plate with the downwardly facing planar surface of the lower plate. A first manifold of the device is communicated with the chamber between the lower and upper plates and hence with the downwardly facing surface of the lower plate through the first set of holes in the lower plate, while a second manifold of the device is communicated with the upper side of the upper plate and hence through the holes therein and the passages with the downwardly facing surface of the lower plate through the second set of holes in the lower plate. One of the manifolds has an inlet for connection to a source of pressurized gas to thereby supply pressurized gas to the downwardly facing surface of the lower plate, and the other manifold has an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate.

The construction of the heated glass sheet topside support device as described above can function effectively without thermal warpage during heating and cooling with even relatively large size glass sheets by virtue of the strength that results from this construction.

Two different constructions of the passage members that connect the lower and upper plates are disclosed. In one construction, the passage members are embodied by tubes that extend between the lower and upper plates with each tube communicated with one of the holes of the second set of holes in the lower plate and with one of the holes in the upper plate. Another construction has the passage members embodied by plate members that extend between the lower and upper plates with adjacent pairs of the plate members cooperating to define the passages that extend vertically through the chamber between the lower and upper plates. Each passage between the associated pair of plate members communicates with a plurality of holes of the second set of holes in the lower plate and with a plurality of the holes in the upper plate.

In the preferred construction disclosed, the first manifold of the topside support device includes a pair of end portions and a connecting portion that extends between the end portions to cooperate therewith in defining a U-shaped configuration. The second manifold is located within the U-shaped configuration defined by the first manifold. In one embodiment, the first manifold has its inlet connected to the source of pressurized gas and the second manifold has its inlet connected to the source of vacuum. With this one embodiment, a set of tubes is mounted by the lower plate at the first set of holes to feed the pressurized gas from the chamber between the plates to the downwardly facing surface of the lower plate to thereby provide sufficient passage length for the pressurized gas to be delivered as jets that space the heated glass sheet from the lower plate. In another embodiment of the topside support device, the first manifold has its inlet connected to the source of vacuum and the second manifold has its inlet connected to the source of pressurized gas.

The preferred construction of the topside support device includes vertically extending fused silica posts that mount the support device for use within a heated chamber of a furnace including a heating conveyor on which the glass sheet is heated prior to being transferred by the support device from the heating conveyor to a bending mold. Each of these posts preferably has an upper end including an associated inverted cup-shaped member on which the support device is mounted. Each inverted cup-shaped member has an associated spherical washer with a flat upper surface on which the support device is mounted for sliding movement. Below its inverted cup-shaped member and associated spherical washer, each post has a lower end including an associated cup-shaped member on which the post is mounted.

Between its upper and lower ends, each post has an associated sleeve-shaped positioner through which the post extends vertically and is thereby supported in its vertically extending orientation.

The preferred construction of the topside support device also includes a locator including a slide connection that allows the support device to expand and contract by sliding on the posts in one direction upon heating and cooling but prevents movement in a second direction transverse to the one direction.

Horizontally extending arms of the topside support device in its preferred construction provide mounting thereof on the fused silica posts. Two of the locators are also preferably utilized and cooperate with each other to permit the support device movement on the posts in the one direction by engagement of the slide connections thereof with associated arm members in a slidable manner along the one direction without permitting any movement in the second direction.

The objects, features and advantages of the present invention are readily apparent from the following detailed description of the best modes for carrying out the invention when taken in connection with the accompanying drawings.

BRIEF DESCRIPTION OF DRAWINGS

FIG. 3 is an elevational view of the topside support device taken along the direction of line 3—3 in FIG. 2 and also illustrates a silica post arrangement on which the topside support device is mounted;

FIG. 4 is a partial bottom plan view of the topside support device taken along the direction of line 4—4 in FIG. 3 and illustrating a lower plate having repeating patterns of spaced holes through which both pressurized gas and a vacuum are supplied to provide the heated glass sheet support without any direct engagement;

FIG. 5 is a partial elevational view of the topside support device taken along the direction of line 5—5 in FIG. 4 to illustrate lower and upper plates that are connected by a set of tubes that define passages and also provide a high strength construction;

FIG. 6 is a partial elevational view of the topside support device taken along the direction of line 6—6 in FIG. 5 to further illustrate the plate and tube construction;

FIG. 7 is a partial view taken on an enlarged scale along line 7—7 of FIG. 5 to illustrate a set of short tubes that provide passageways for pressurized gas to be delivered below the lower plate from a chamber between the plates that are connected by the longer tubes shown in FIGS. 5 and 6;

FIG. 10 is a partially sectional view taken along the direction of line 10—10 in FIG. 9 to further illustrate the silica post support construction;

FIG. 11 is a partial view taken in the same direction as FIG. 2 on an enlarged scale to illustrate a locator of the topside support device;

FIG. 12 is a partial view that is also taken in the same direction as FIG. 2 on an enlarged scale to illustrate the manner in which the topside support device is allowed to expand and contract in two directions while mounted on the silica post arrangement;

BEST MODES FOR CARRYING OUT THE INVENTION

Figure 1:
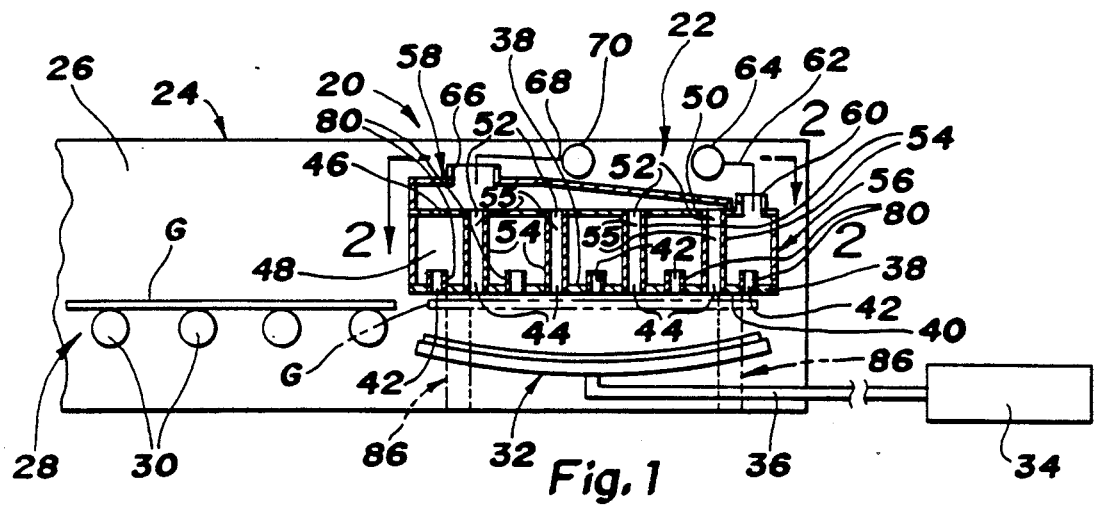
FIG. 1 is a somewhat schematic side elevational view of a glass sheet processing system including one embodiment of a topside support device for supporting a heated glass sheet in accordance with the invention.

With reference to FIG. 1 of the drawings, a glass sheet processing system identified by 20 provides heating and bending of a glass sheet through the use of a topside support device 22 constructed in accordance with the present invention. More specifically, the system 20 includes a furnace 24 having a heating chamber 26 in which a heating conveyor 28 of any conventional construction is located. As illustrated, the heating conveyor 28 has conveyor rolls 30 on which the glass sheet G is conveyed during the heating prior to transfer to the topside support device 22. This topside support device 22 transfers the heated glass sheet from the heating conveyor 28 to a mold 32 for forming in any suitable manner such as by sagging on the mold or pressing between the illustrated mold and another unshown mold. An actuator 34 has a connection 36 that moves the mold 32 from the illustrated position below the topside support device 22 for forming solely by gravity or in association with another mold and for subsequent cooling either by a slow cooling process that provides annealing or by a rapid quench that provides tempering. The design shown is similar to a beam design which provides low stress and high temperature stability.

With continuing reference to FIG. 1 and additional reference to FIGS. 2 through 7, the topside support device 22 includes a horizontally extending lower plate 38 made of a high temperature metal and has a uniform thickness. The lower metal plate 38 has a downwardly facing planar surface 40 and first and second sets of spaced holes 42 and 44 arranged in repeating patterns and extending downwardly through the lower plate as is hereinafter more fully described. A horizontally extending upper plate 46 of the topside support device is also made of high temperature metal and cooperates with the lower plate 38 to define a chamber 48 communicated through the first set of holes 42 in the lower plate with the downwardly facing planar surface 40 of the lower plate. The upper plate 46 has an upper side 50 and includes a set of holes 52 extending downwardly therethrough from its upper side 50 to the chamber 48. A set of vertically extending passage members of the topside support device 22 are embodied by tubes 54 having lower ends fixedly mounted by the lower plate 38 and also have upper ends fixedly mounted by the upper plate. The passage members embodied by tubes 54 define passages 55 communicated through the set of holes 52 in the upper plate 46 with the upper side 50 thereof and also communicated through the second set of holes 44 in the lower plate 38 with its downwardly facing planar surface 40.

Figure 2:
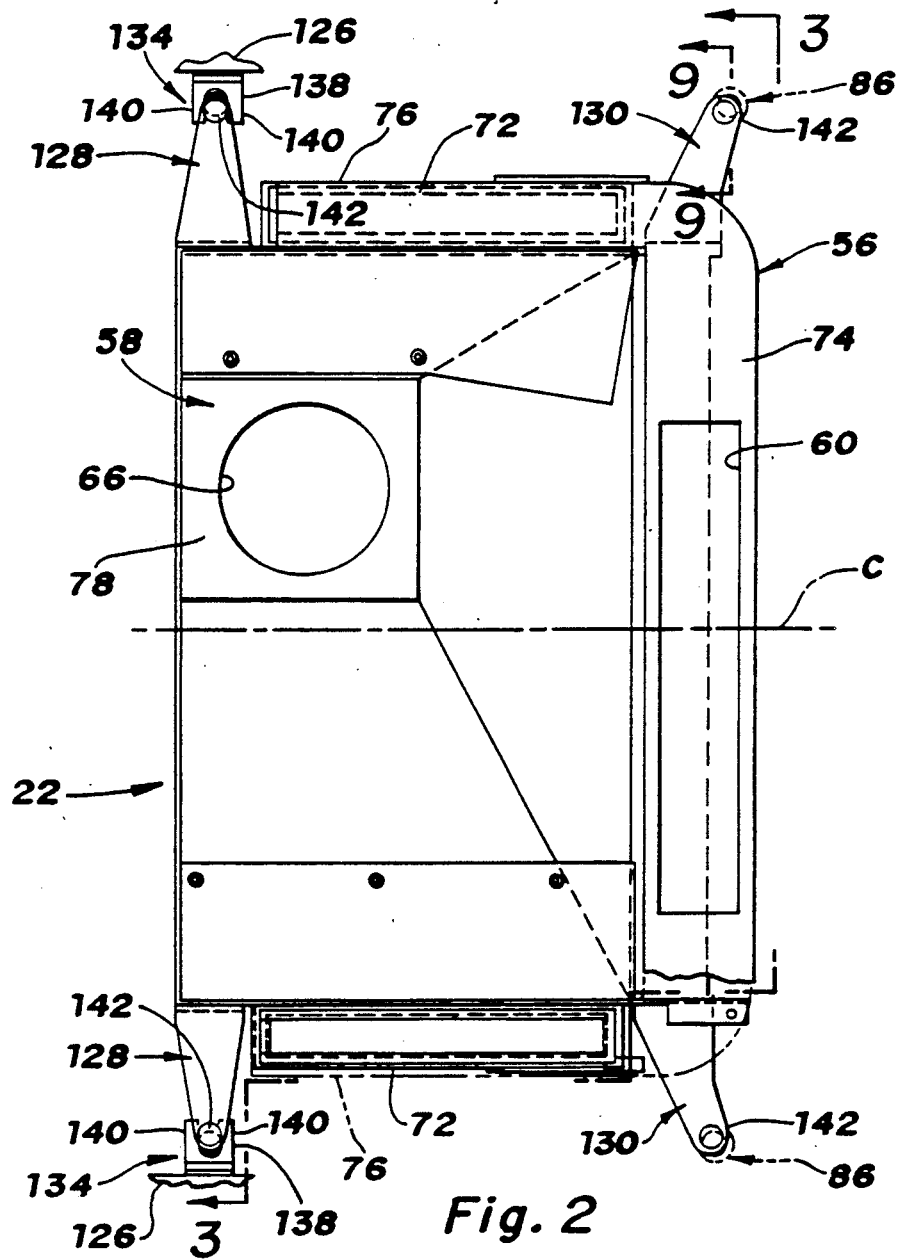
FIG. 2 is a top plan view of the topside support device taken along the direction of line 2—2 in FIG. 1.

As shown by combined reference to FIGS. 1 and 2, the topside support device 22 includes a first manifold 56 communicated with the chamber 48 between the lower and upper plates 38 and 46 and hence with the downwardly facing surface 40 of the lower plate through the first set of holes 42 in the lower plate. A second manifold 58 of the topside support device is communicated with the upper side 50 of the upper plate 46 and hence through the passages 55 defined by the passage members embodied by tubes 54 with the downwardly facing surface 40 of the lower plate 38 through the second set of holes 44 in the lower plate. The one manifold 56 has an inlet 60 that is connected by a conduit 62 to a source of pressurized gas 64 to thereby supply pressurized gas to the downwardly facing surface 40 of the lower plate 38. The other manifold 58 has an inlet 66 communicated by conduit 68 with a vacuum source 70 to supply a vacuum at the downwardly facing surface 40 of the lower plate 38 and thereby cooperate with the pressurized gas supplied thereto in supporting the heated glass sheet as shown by phantom line representation in FIG. 1. Both the pressurized gas source 64 and the vacuum source 70 are preferably embodied by high temperature fans that are located within the heating chamber 20 in which the topside support device 22 is also mounted as is hereinafter more fully described. The conduit 62 connected to the one manifold 56 is thus communicated with the pressure side of the associated fan that embodies the pressurized gas source 64, while the conduit 68 connected to the other manifold 58 is communicated with the vacuum side of the associated fan that embodies the vacuum source 70.

As shown by combined reference to FIGS. 2 and 3, the first manifold 56 includes a pair of end portions 72 and a connecting portion 74 that extends between the ends portions and cooperate therewith in defining a U-shaped configuration. The inlet 60 to the first manifold is on the upper side of the connecting portion 74 as shown in FIG. 2. Each end portion 72 of the manifold has a lower manifold portion 76 as shown in FIG. 3 projecting downwardly for communication with the adjacent end of the topside support device at its chamber through which the pressurized gas is supplied as previously described.

Within the U-shaped configuration of the first manifold 56, the second manifold 58 is located as shown in FIG. 2. This second manifold 58 as illustrated by additional reference to FIG. 3 has a three-sided sloped configuration with an upper level side 78 at which its inlet 66 is located.

With combined reference to FIGS. 1 through 3, the first manifold 56 as previously mentioned has its inlet 62 connected to the pressurized gas source 64 such that the pressurized gas is fed downwardly from the chamber 48 between the lower and upper plate 38 and 46 through the first set of holes 42, and the second manifold 58 has its inlet 66 connected to the vacuum source 70 such that the vacuum is drawn through the passages 55 defined by the passage members embodied by tubes 54 whose lower ends are communicated with the second set of holes 44 in the lower plate 38. Another set of shorter tubes 80 of this embodiment are mounted by the lower plate 38 within the first set of holes 42 to feed the pressurized gas from the chamber 48 between the plates to the downwardly facing surface 40 of the lower plate 38. These tubes 80 as also illustrated in FIGS. 5 and 7 provide a sufficient passage length so that the pressurized gas flow develops as jets that have the capability to space a commercial size glass sheet G from the downwardly facing plate surface 40 in association with the vacuum that is also drawn. These tubes 80 can be conveniently embodied by high temperature metal roll pins and preferably have lower flared ends 82 as shown in FIG. 7 for facilitating the gas jet flow downwardly.

Figure 8:
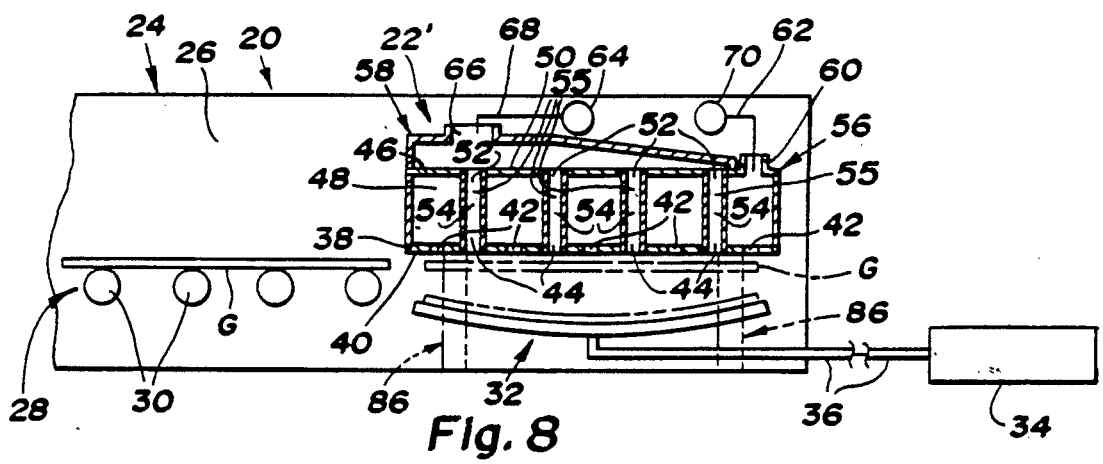
FIG. 8 is a somewhat schematic elevational view of a glass sheet processing system including another embodiment of the topside support device for supporting a heated glass sheet wherein the pressurized gas is supplied from a manifold located above the upper plate and the vacuum is drawn from the chamber between the plates.

With reference to FIG. 8, another embodiment of the topside support device 22' has the same construction as the previously described embodiment of FIG. 1 except as will be noted such that like components thereof have like reference numerals. This embodiment of the topside support device 22' has its inlet 60 connected by the associated conduit 62 to the vacuum source 70 such that a vacuum is drawn within the chamber 48 and hence through the first set of holes 42 through the lower plate 38 at its downwardly facing surface 40. Furthermore, the second manifold 58 has its inlet 66 connected through the conduit 68 to the pressurized gas source 64 which feeds pressurized gas to the upper side 50 of the upper plate 46 and thus through the passages 55 defined by the passage members embodied by tubes 54 and through the second set of holes 44 in the lower plate 38 to the downwardly facing surface 40 of the lower plate. With this embodiment, the passages 55 defined by the passage members embodied by tubes 54 provide sufficient passage length to develop the gas jets supplied through the lower plate 38 so as to be capable of cooperating with the vacuum drawn through the first set of holes 42 in supporting the glass sheet G as shown by phantom line representation just below the downwardly facing surface 40 of the lower plate 38.

As illustrated by combined reference to FIGS. 4 through 7, the first and second sets of holes 42 and 44 in the lower plate 38 are arranged in alternating rows that extend transversely to the direction of conveyance indicated by arrow C in FIG. 4. Thus, when the pressurized gas is fed through the chamber 48 between the lower and upper plates 38 and 46 as with the embodiment of FIG. 1, there are alternating rows of the longer and shorter tubes 54 and 80 previously described. Each of the longer tubes is made from high temperature metal and has its upper and lower ends received within the associated set of plate holes 44 and 52 with securement being provided in any suitable manner such as by brazing within a vacuum. These tubes 54 are about 10 inches (about 25 cm.) long and have an outside diameter of about 7/16 of an inch (just slightly greater than a centimeter) and an inside diameter of about ¼ of an inch (about ⅝ of a cm.). Each of the shorter tubes 80 is preferably constructed as a stainless steel roll pin that can be conveniently forced into the associated hole 42 by a press fit and then subsequently machined to provide the lower flared end 82. These roll pin tubes 80 have a length of one inch (about 2.5 cm.), an outside diameter of ⅛ of an inch (about 0.3 cm.) and an inside diameter of about 0.1 of an inch (about 0.25 cm.). Both the lower and upper plates 38 and 40 of the embodiment disclosed are made of high temperature metal plate about ⅜ inch (about 1 cm.) thick and are most preferably spaced from each other by the tubes 54 a distance of about 10 inches (about 25 cm.) or more so as to provide a construction that is capable of resisting thermal warpage. Vertical plate walls 83 shown in FIG. 4 close the upstream and downstream ends of the support device and thus extend between its lateral ends where the lower end portions 76 of the second manifold 58 are communicated with the chamber between the lower and upper plates to either supply pressurized gas or a vacuum to the chamber depending upon which support device embodiment 22 or 22' is involved. Each corner of the rectangular shape of the support device has a support plate 84 (FIG. 4) that extends between the lower and upper plates 38 and 46 so as to provide mounting of the support device as is hereinafter more fully described.

During operation of the topside support device as described above, the pressurized gas is supplied at a level in the range of about 1.5 to 3 inches (about 3.6 to 7.6 cm.) water column and the extent of vacuum is in the range of about 2 to 3 inches (about 5 to 7.5 cm.) water column. Of course, the extent of pressurized gas and vacuum should be adjusted for glass thickness, size and shape to provide the desired spacing with the topside support device.

With combined reference to FIGS. 1, 3 and 8 through 10, each embodiment of the topside support device 22 and 22' includes fused silica posts 86 that mount the support device such that its downwardly facing surface 40 is just approximately 0.020 to 0.030 of an inch (about 50 to 75 mm.) higher than the upper surface of the conveyed glass sheet on the heating conveyor 28. This spacing of 0.020 to 0.030 of an inch (50 to 75 mm.) corresponds to the spacing between the glass sheet and the topside support device when supported by the pressurized gas and vacuum as previously described. These fused silica posts 86 can most conveniently be manufactured by sinter bonding of fused silica particles that have been molded to the post shape with an elongated shape of a round cross-section prior to any necessary machining for finishing the post shape.

As illustrated in FIG. 3, each silica post 86 is supported by an associated jack 88 that is adjustable as indicated by arrows 90 to adjust the elevation of the downwardly facing surface 40 of the support device so as to thereby have the required elevation with respect to the heating conveyor that delivers the heated glass sheet as previously described. A connecting shaft 92 illustrated at the left side of FIG. 3 connects the two jacks 88 that support the silica posts 86 at the upstream end of the support device and has an adjustable coupler 94 whose adjustment permits leveling of the support device between its opposite lateral sides. Likewise, as illustrated by the right side of FIG. 3, a connecting shaft 96 connects the two jacks 88 that support the two silica posts 86 at the downstream end of the topside support device and has an adjustable coupler 98 that permits leveling between the opposite lateral sides at this downstream end. A suitable control between the upstream and downstream connecting shafts 92 and 96 provides adjustment of the elevation of the downwardly facing surface 40 at which the glass sheet is supported by the provision of pressurized gas and vacuum as previously described. Good results have been achieved by inclining the downwardly facing surface 40 at a 1° angle of downward inclination along the direction of conveyance such that gravity assists the roll rotation of the heating conveyor in transferring the glass sheet to the topside support device. Any suitable type of positioner can be utilized to position the supported glass sheet at the appropriate location on the downwardly facing surface 40 of the topside support device so as to be located for proper positioning on the bending mold upon release.

Figure 9:
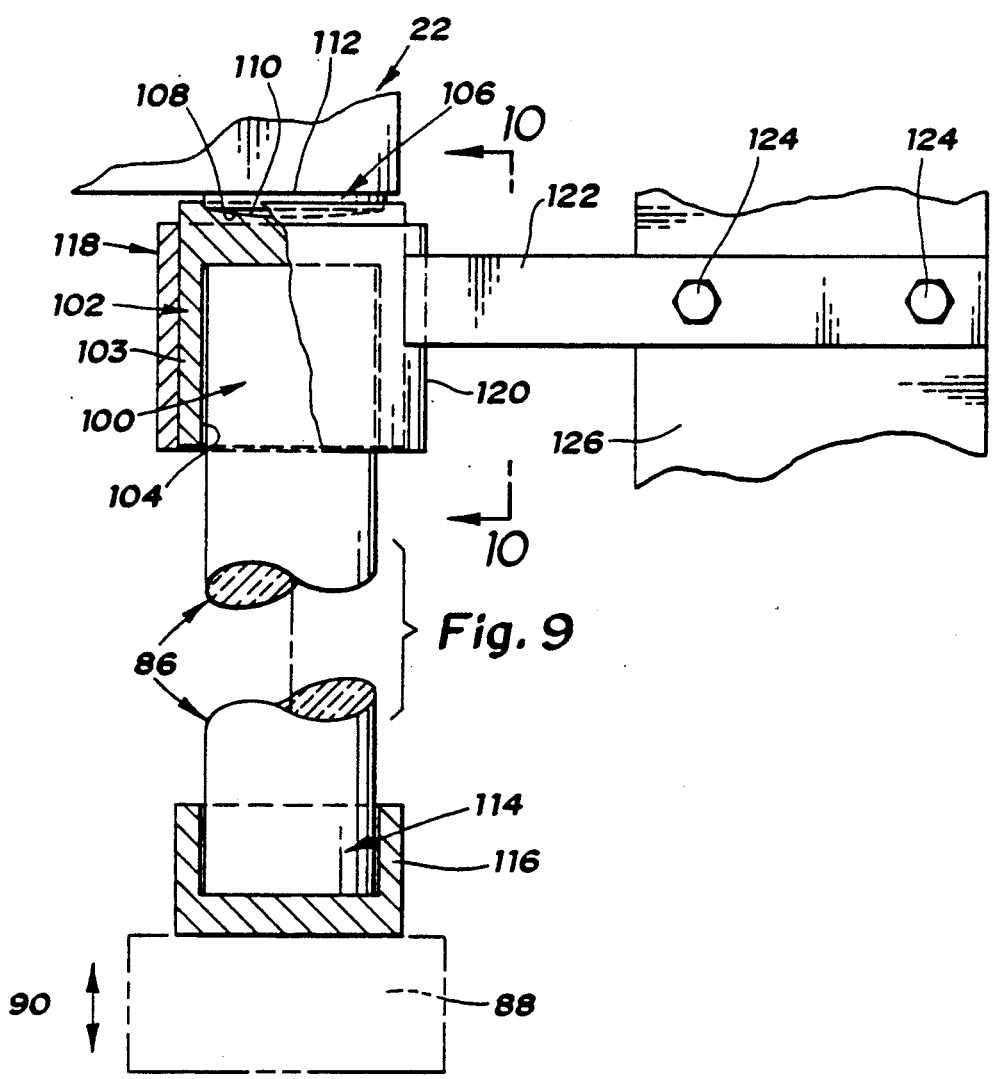
FIG. 9 is a partially broken away enlarged elevational view taken along the direction of line 9—9 in FIG. 1 to illustrate a silica post arrangement on which the topside support device is mounted for sliding movement that accommodates for thermal expansion and contraction.

With reference to FIG. 9, each fused silica post has an upper end 100 including an associated inverted cup-shaped member 102 on which the topside support device 22 is mounted. The inverted cup-shaped member 102 has a wall 103 that defines an interior 104 for receiving the upper post end 100 so as to be fixed on the post. A spherical washer 106 associated with each cup-shaped member 102 has a downwardly facing partially spherical surface 108 that is slidably supported by an upwardly facing partially spherical surface 110 of the inverted cup-shaped member 102 just above the upper end 100 of the post. An upwardly facing flat surface 112 of the spherical washer 106 supports the topside support device 22 as is hereinafter more fully described for sliding movement that accommodates for thermal expansion and contraction upon heating and cooling. Sliding between the spherical surfaces 108 and 110 of the washer and the inverted cup-shaped member permits the upper flat surface 112 of the washer to assume the required inclination for supporting the topside support device.

As illustrated by continuing reference to FIG. 9, each fused silica post 86 also has a lower end 114 that is received within a cup-shaped member 116 supported by the associated jack 88 for vertical adjusting movement as indicated by arrow 90. This cup-shaped member 116 at the lower post end 114 as well as the inverted cup-shaped member 102 at the upper post end 100 prevents spalling of the post ends and thereby increases the effect of lifetime of use.

As illustrated in FIGS. 9 and 10, each fused silica post 86 has an associated sleeve-shaped positioner 118 through which the post extends vertically. Each positioner has a vertically extending sleeve 120 supported by one end of a horizontally extending arm 122 that is secured by bolt fasteners 124 on the associated furnace wall 126 with suitable adjustment being provided as necessary such as by shims and associated slots so that the sleeve 120 can be properly positioned. Preferably, the sleeve 120 receives the fused silica post 86 at the upper post end 100 where the inverted cup-shaped member 102 is supported. Thus, as shown in FIG. 3, the vertically extending wall 103 of the inverted cup-shaped member 102 is interposed between the upper post end 100 and the positioner sleeve 120.

As illustrated in FIG. 2, the topside support device preferably includes horizontally extending arm members identified by 128 at the upstream end and by 130 at the downstream end. These arm members 128 and 130 each have an inner end mounted by one of the support plates 84 (FIG. 4) of the topside support device and secured by suitable bolt or other type fasteners 132 as shown by the downstream arm member 130 illustrated at the right of FIG. 3.

As illustrated by combined reference to FIGS. 2, 3 and 11, each upstream support arm member 128 has an associated locator 134 mounted on the adjacent furnace wall 126 and including a slide connection 136 that allows the support device to expand and contract upon heating and cooling along one direction as shown by arrow T transverse to the direction of conveyance C. However, the locator 134 prevents movement of the support device along the direction of conveyance C transverse to the direction T. More specifically, the locator 134 includes a slide bracket 138 mounted on the adjacent furnace wall 126 and having a pair of spaced arms 140 that slidably capture the outer end 142 of the adjacent support arm member 128 so as to permit the movement thereof along the direction T while preventing the movement of the support device along the direction of conveyance C. During the movement of the support device along the direction T, the outer end 142 of the support arm member 128 slides along the upper flat surface of the associated spherical bearing 106 as previously described in connection with FIGS. 9 and 10.

With reference to FIG. 12, each of the downstream support arm members 130 has an outer end 144 that is slidably supported on the associated silica post 86 for movement along both the direction of conveyance C and the transverse direction T to accommodate for the expansion and contraction of the support device upon heating and cooling.

Figure 13:
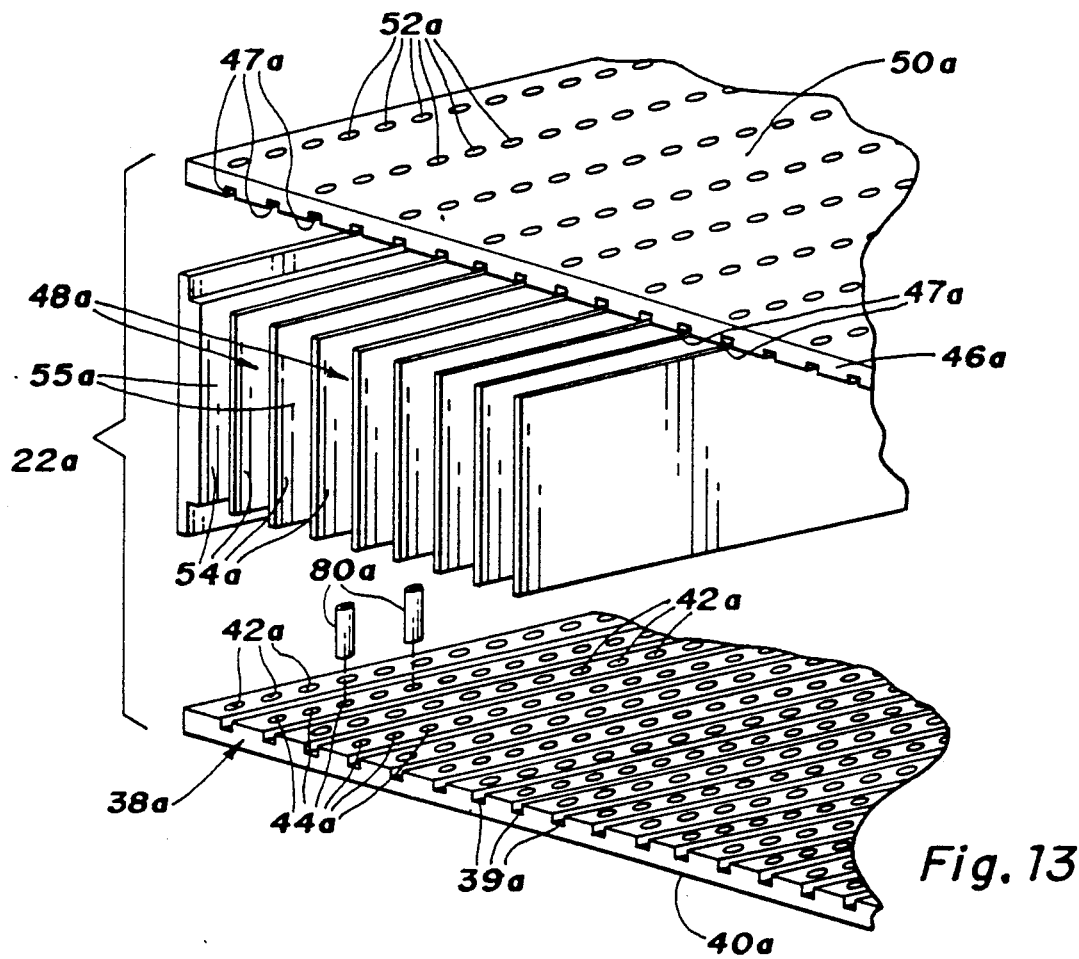
FIG. 13 is an exploded perspective view of a further embodiment of the topside support device for supporting a heated glass sheet wherein the lower and upper plates are connected by plate members that define passages through the chamber between the plates.
Figures 14, 15:
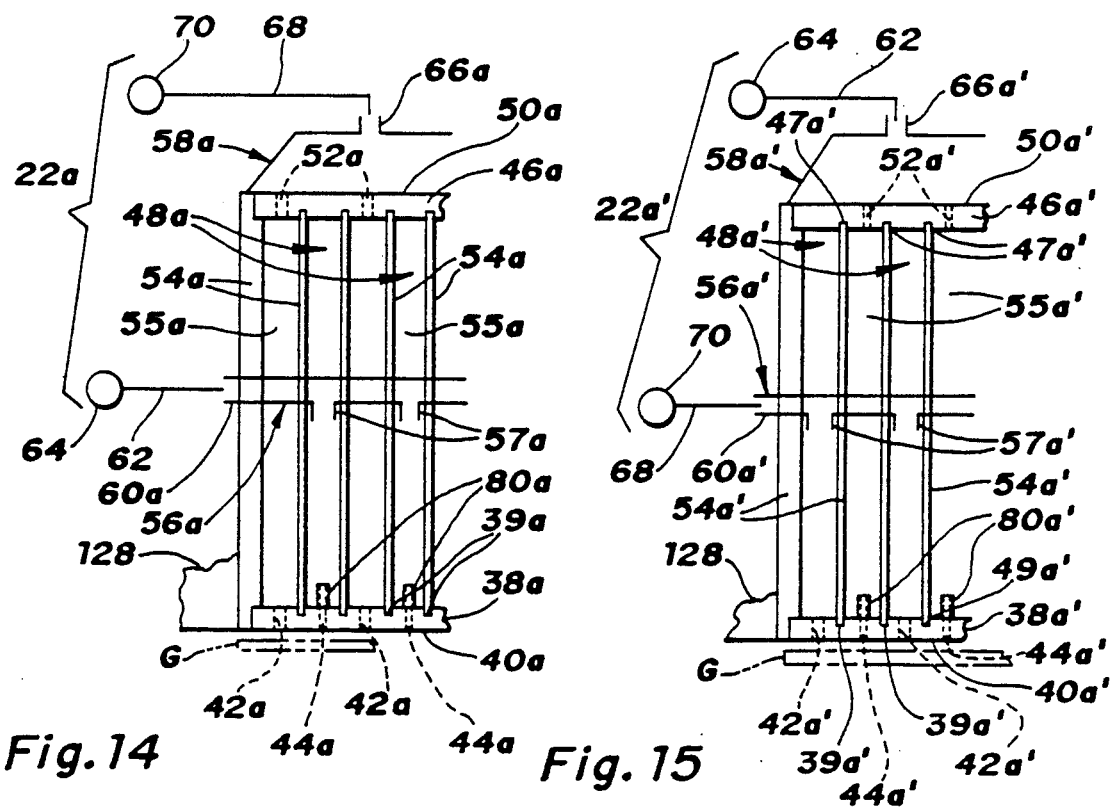
FIG. 14 is a side view of the embodiment of the topside support device shown in FIG. 13 wherein pressurized gas is supplied to the chamber between the lower and upper plates and a vacuum is drawn at the upper side of the upper plate and hence through the passages defined by the vertically extending plate members and through holes in the plates to cooperate with the pressurized gas supplied at the downwardly facing lower plate surface in supporting the heated glass sheet.
FIG. 15 is a view of a modified embodiment of the topside support device illustrated in FIG. 13 wherein the vacuum is drawn at the chamber between the lower and upper plates and the pressurized gas is supplied to the upper side of the upper plate and hence through the passages defined by the plate members between the upper and lower plates and through holes in the plates to cooperate with the vacuum drawn at the downwardly facing surface of the lower plate in supporting the heated glass sheet.

With reference to FIGS. 13 and 14, a further embodiment of the heated glass sheet topside support device is identified by 22a and has its lower and upper high temperature metal plates 38a and 46a respectively provided with upwardly and downwardly facing grooves 39a and 40a. Each upwardly facing groove 39a of the lower plate 38a is located between a row of the first set of holes 42a and a row of the second set of holes 44a. The upper plate 46a has its grooves 47a provided in pairs between rows of the holes 52a in the upper plate. The passage members of this embodiment are embodied by plate members 54a that extend vertically between the lower and upper plates with the lower ends of these plate members T respectively received by the grooves 39a in the lower plate 38a and with the upper ends of these plates respectively received by the grooves 47a in the upper plate 46a. Adjacent pairs of the plate member 54a cooperate to define the passages 55a that extend between the lower and upper plates through the chamber 48a defined between these plates. Suitable securement such as brazing is utilized to secure the plate member ends within the plate grooves 39a and 47a after assembly as illustrated in FIG. 14, and arm members 128 provide mounting thereof on silica posts as previously described. Within the chamber 48, the support device 22a has the tubes 80a provided within the second set of holes 44a to feed pressurized gas to the downwardly facing surface 40a of the lower plate 38a.

With continuing reference to FIG. 14, the topside support device 22a has the first manifold 56a which is schematically shown provided with its inlet 69a communicated through the conduit 62 with the source of pressurized gas 64. This first manifold 56a has a pair of end portions and a connecting portion that define a U-shaped configuration thereof as previously described, and each end portion has connections 57a with the chamber 48a so as to feed the pressurized gas into the chamber between the lower and upper plates 38a and 46a and to thereby feed the pressurized gas through the tubes 89a to the downwardly facing planar surface 40a. As also shown in FIG. 14, the second manifold 58a has its inlet 66a connected through the conduit 68 with the source of vacuum 70. This second manifold 58a thus communicates the vacuum source 70 through the holes 52a in the upper plate 46a to the passages 55a defined by the plate members 54a. As such, the vacuum is drawn through the passages 55a and through the first set of holes 42a in the lower plate 38a so as to cooperate with the pressurized gas in supporting the heated glass sheet G in a spaced relationship to the downwardly facing surface 40a. Each passage 55a is communicated with a plurality of the first set of holes 42a in the lower plate 38a and with a plurality of the holes 52a in the upper plate 46a to support the glass sheet G.

With reference to FIG. 15, a modification of the topside support device illustrated in FIGS. 13 and 14 is identified by 22a' and has its lower and upper high temperature metal plates 38a' and 46a' connected by vertically extending plate members 54a' whose upper and lower ends are respectively received by the plate grooves 39a' and 47a' to define the passages 55a' through the chamber 48a' between the lower and upper plates. This modified topside support device 22a' has the source of vacuum 70 connected through the conduit 68 to the schematically illustrated first manifold 56a' which also has a U-shaped configuration as previously described with end portions whose connections 57a' are communicated with the chamber 48a' between plate members 54a' for communication with a plurality of the first set of holes 42a in the lower plate 38a'. The source of pressurized gas 64 is communicated through the conduit 62 to the inlet 66a' of the second manifold 58a'. Thus, the pressurized gas is fed to the upper side 50a' of the upper plate 46a' and through the holes 52a' in the upper plate to the passages 55a' defined by the plate members 54a'. This pressurized gas is further fed downwardly through the passages 55a' to the tubes 80a' for flow to the second set of holes 44a' in the lower plate 38a' to its downwardly facing planar surface 40a'. The vacuum and pressurized gas fed to the downwardly facing planar surface 40a' of the lower plate 38a' cooperate to support the heated glass sheet G without engagement. Each of the passages 55a' is communicated with a plurality of the second set of holes 44a' through a plurality of the tubes 80a' and is also communicated with a plurality of the holes 52a' that are fed pressurized gas by the second manifold 58a'. This support device 22a' also has arm member 128 supported by fused silica posts as previously described.

Each embodiment of the topside support device has its components made from high temperature metal which may be stainless steel or a suitable nickel or chromium based alloy capable of withstanding the high temperature to which glass sheets are heated. Best results have been obtained with 304 stainless steel which has good resistance to scaling for its cost.

While the best modes for carrying out the invention have been described in detail, those familiar with the art to which this invention relates will recognize various alternative designs and embodiments for practicing the invention as defined by the following claims.

What is claimed is:

1. A heated glass sheet topside support device, comprising:
   a horizontally extending lower plate made of high temperature metal and having a uniform thickness, and said lower plate including a downwardly facing planar surface and having first and second sets of spaced holes arranged in repeating patterns and extending downwardly through the lower plate;
   a horizontally extending upper plate made of high temperature metal and cooperating with the lower plate to define a chamber communicated through the first set of holes in the lower plate with the downwardly facing planar surface of the lower plate, and said upper plate having an upper side and including a set of holes extending downwardly therethrough from its upper side to the chamber;
   a set of vertically extending passage members having lower ends fixedly mounted by the lower plate and having upper ends fixedly mounted by the upper plate, and said passage members defining passages communicated through the set of holes in the upper plate with the upper side thereof and the passages being communicated through the second set of holes in the lower plate with its downwardly facing planar surface;
   a first manifold communicated with the chamber between the lower and upper plates and hence with the downwardly facing surface of the lower plate through the first set of holes in the lower plate;
   a second manifold communicated with the upper side of the upper plate and hence through the holes therein and the passages with the downwardly facing surface of the lower plate through the second set of holes in the lower plate; and
   one of the manifolds having an inlet for connection to a source of pressurized gas to thereby supply pressurized gas to the downwardly facing surface of the lower plate, and the other manifold having an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate.

2. A heated glass sheet topside support device as in claim 1 wherein the passage members comprise tubes that extend between the lower and upper plates with each tube communicated with one of the holes of the second set of holes in the lower plate and with one of the holes in the upper plate.

3. A heated glass sheet topside support device as in claim 1 wherein the passage members comprise plate members that extend between the lower and upper plates with adjacent pairs of the plate members cooperating to define the passages that extend vertically through the chamber between the lower and upper plates, and each passage between the associated pair of plate members communicating with a plurality of holes of the second set of holes in the lower plate and with a plurality of the holes in the upper plate.

4. A heated glass sheet topside support device as in claim 1 wherein the first manifold includes a pair of end portions and a connecting portion that extends between the end portions to cooperate therewith in defining a U-shaped configuration, and the second manifold being located within the U-shaped configuration defined by the first manifold.

5. A heated glass sheet topside support device as in any one of claims 1 through 4 wherein the first manifold has its inlet connected to the source of pressurized gas and the second manifold has its inlet connected to the source of vacuum.

6. A heated glass sheet topside support device as in claim 5 further including a set of tubes mounted by the lower plate at the first set of holes to feed the pressurized gas from the chamber between the plates to the downwardly facing surface of the lower plate.

7. A heated glass sheet topside support device as in any one of claims 1 through 4 wherein the first manifold has its inlet connected to the source of vacuum and the second manifold has its inlet connected to the source of pressurized gas.

8. A heated glass sheet topside support device as in claim 1 further including vertically extending fused silica posts that mount the support device.

9. A heated glass sheet topside support device as in claim 8 wherein each post has an upper end including an associated inverted cup-shaped member on which the support device is mounted.

10. A heated glass sheet topside support device as in claim 9 wherein each inverted cup-shaped member has an associated spherical washer having a flat upper surface on which the support device is mounted for sliding movement.

11. A heated glass sheet topside support device as in claim 8, 9 or 10 wherein each post has a lower end including an associated cup-shaped member on which the post is mounted.

12. A heated glass sheet topside support device as in claim 8 wherein each post has an associated sleeve-shaped positioner through which the post extends vertically.

13. A heated glass sheet topside support device as in claim 8 or 12 further including a locator including a slide connection that allows the support device to expand and contract by sliding on the posts in one direction upon heating and cooling but prevents movement in a second direction transverse to the one direction.

14. A heated glass sheet topside support device as in claim 13 which includes horizontally extending arm members that mount the support device on the fused silica posts, the support device having two of the locators that cooperate with each other to permit the movement in the one direction, and the slide connection of each locator engaging an associated arm member in a slidable manner along the one direction without permitting any movement thereof in the second direction.

15. A heated glass sheet topside support device, comprising:
a horizontally extending lower plate made of high temperature metal and having a uniform thickness, and said lower plate including a downwardly facing planar surface and having first and second sets of spaced holes arranged in repeating patterns and extending downwardly through the lower plate;
a horizontally extending upper plate made of high temperature metal and cooperating with the lower plate to define a chamber communicated through the first set of holes in the lower plate with the downwardly facing planar surface of the lower plate, and said upper plate having an upper side and including a set of holes extending downwardly therethrough from its upper side to the chamber;
a set of vertically extending tubes having lower ends fixedly mounted by the lower plate and communicating through the second set of holes therein with the downwardly facing planar surface of the lower plate, and the vertically extending tubes having upper ends fixedly mounted by the upper plate and communicated through the set of holes in the upper plate with the upper side thereof;
a first manifold communicated with the chamber between the lower and upper plates and hence with the downwardly facing surface of the lower plate through the first set of holes in the lower plate;
a second manifold communicated with the upper side of the upper plate and hence through the holes therein and the tubes with the downwardly facing surface of the lower plate through the second set of holes in the lower plate;
one of the manifolds having an inlet for connection to a source of pressurized gas to thereby supply pressurized gas to the downwardly facing surface of the lower plate, and the other manifold having an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate; and
fused silica posts that extend vertically and each have an upper end including an inverted cup-shaped member having a washer on which the support device is slidably mounted.

16. A heated glass sheet topside support device, comprising:
a horizontally extending lower plate made of stainless steel and having a uniform thickness, and said lower plate including a downwardly facing planar surface and having first and second sets of spaced holes arranged in repeating patterns and extending downwardly through the lower plate;
a horizontally extending upper plate made of stainless steel and cooperating with the lower plate to define a chamber communicated through the first set of holes in the lower plate with the downwardly facing planar surface of the lower plate, and said upper plate having an upper side and including a set of holes extending downwardly therethrough from its upper side to the chamber;
a set of vertically extending tubes having lower ends fixedly mounted by the lower plate and communicating through the second set of holes therein with the downwardly facing planar surface of the lower plate, and the vertically extending tubes having upper ends fixedly mounted by the upper plate and communicated through the set of holes in the upper plate with the upper side thereof;
a first manifold communicated with the chamber between the lower and upper plates and hence with the downwardly facing surface of the lower plate through the first set of holes in the lower plate;
a second manifold communicated with the upper side of the upper plate and hence through the holes therein and the tubes with the downwardly facing surface of the lower plate through the second set of holes in the lower plate;
one of the manifolds having an inlet for connection to a source of pressurized gas to thereby supply pressurized gas to the downwardly facing surface of the lower plate, and the other manifold having an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate;
horizontally extending arms that extend from the support device;
fused silica posts that extend vertically and each have an upper end, inverted cup-shaped members that respectively receive the upper post ends, and each cup-shaped member including a spherical bearing that slidably supports an associated arm of the support device;
sleeve-shaped positioners through which the posts respectively extend to provide positioning of the posts; and
at least one locator including a slide connection that allows the support device to expand and contract by sliding on the post bearings in one direction upon heating and cooling but prevents movement in a second direction transverse to the one direction.

17. A heated glass sheet topside support device, comprising:
a horizontally extending lower plate made of high temperature metal and having a uniform thickness, and said lower plate including a downwardly facing planar surface and having first and second sets of spaced holes arranged in repeating patterns and extending downwardly through the lower plate;
a horizontally extending upper plate made of high temperature metal and cooperating with the lower plate to define a chamber communicated through the first set of holes in the lower plate with the downwardly facing planar surface of the lower plate, and said upper plate having an upper side and including a set of holes extending downwardly therethrough from its upper side to the chamber;

a set of vertically extending plate members having lower ends fixedly mounted by the lower plate and having upper ends fixedly mounted by the upper plate, said plate members cooperating in pairs to define passages that extend vertically between the lower and upper plates, each passage between the associated pair of plate members communicating with the downwardly facing surface of the lower plate through a plurality of holes of the second set of holes in the lower plate, and each passage between the associated pair of plate members also communicating with the upper side of the upper plate through a plurality of the holes in the upper plate;

a first manifold communicated with the chamber between the lower and upper plates and hence with the downwardly facing surface of the lower plate through the first set of holes in the lower plate;

a second manifold communicated with the upper side of the upper plate and hence through the holes therein and the passages with the downwardly facing surface of the lower plate through the second set of holes in the lower plate;

one of the manifolds having an inlet for connection to a source of pressurized gas to thereby supply pressurized gas to the downwardly facing surface of the lower plate, and the other manifold having an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate; and fused silica posts that extend vertically and each have an upper end including an inverted cup-shaped member having a washer on which the support device is slidably mounted.

18. A heated glass sheet topside support device, comprising:

a horizontally extending lower plate made of stainless steel and having a uniform thickness, and said lower plate including a downwardly facing planar surface and having first and second sets of spaced holes arranged in repeating patterns and extending downwardly through the lower plate;

a horizontally extending upper plate made of stainless steel and cooperating with the lower plate to define a chamber communicated through the first set of holes in the lower plate with the downwardly facing planar surface of the lower plate, and said upper plate having an upper side and including a set of holes extending downwardly therethrough from its upper side to the chamber;

a set of vertically extending plate members having lower ends fixedly mounted by the lower plate and having upper ends fixedly mounted by the upper plate, said plate members cooperating in pairs to define passages that extend vertically between the lower and upper plates, each passage between the associated pair of plate members communicating with the downwardly facing surface of the lower plate through a plurality of holes of the second set of holes in the lower plate, and each passage between the associated pair of plate members also communicating with the upper side of the upper plate through a plurality of the holes in the upper plate;

a first manifold communicated with the chamber between the lower and upper plates and hence with the downwardly facing surface of the lower plate through the first set of holes in the lower plate;

a second manifold communicated with the upper side of the upper plate and hence through the holes therein and the passages with the downwardly facing surface of the lower plate through the second set of holes in the lower plate;

one of the manifolds having an inlet for connection to a source of pressurized gas to thereby supply pressurized gas to the downwardly facing surface of the lower plate, and the other manifold having an inlet for connection to a vacuum source to supply a vacuum at the downwardly facing surface of the lower plate and cooperate with the pressurized gas supplied thereto in supporting a heated glass sheet below the lower plate without the glass sheet engaging the lower plate;

horizontally extending arms that extend from the support device;

fused silica posts that extend vertically and each have an upper end, inverted cup-shaped members that respectively receive the upper post ends, and each cup-shaped member including a spherical bearing that slidably supports an associated arm of the support device;

sleeve-shaped positioners through which the posts respectively extend to provide positioning of the posts; and at least one locator including a slide connection that allows the support device to expand and contract by sliding on the post bearings in one direction upon heating and cooling but prevents movement in a second direction transverse to the one direction.

* * * * *

UNITED STATES PATENT AND TRADEMARK OFFICE
CERTIFICATE OF CORRECTION

PATENT NO. : 5,002,599

DATED : March 26, 1991

INVENTOR(S) : Ronald G. McMaster et al

It is certified that error appears in the above-identified patent and that said Letters Patent is hereby corrected as shown below:

Column 6, Line 28
"ends" should be --end--.

Column 10, Line 34
"69a" should be --66a--.

Column 10, Line 43
"89a" should be --80a--.

Signed and Sealed this

Third Day of November, 1992

Attest:

DOUGLAS B. COMER

*Attesting Officer*     Acting Commissioner of Patents and Trademarks